(12) United States Patent
Varma et al.

(10) Patent No.: US 11,295,052 B1
(45) Date of Patent: Apr. 5, 2022

(54) TIME CORRELATION IN HYBRID EMULATION SYSTEM

(71) Applicant: Synopsys, Inc., Mountain View, CA (US)

(72) Inventors: Ashutosh Varma, Milpitas, CA (US); Filip Constant Thoen, San Jose, CA (US)

(73) Assignee: Synopsys, Inc., Mountain View, CA (US)

( * ) Notice: Subject to any disclaimer, the term of this patent is extended or adjusted under 35 U.S.C. 154(b) by 831 days.

(21) Appl. No.: 16/022,272

(22) Filed: Jun. 28, 2018

Related U.S. Application Data

(60) Provisional application No. 62/527,971, filed on Jun. 30, 2017.

(51) Int. Cl.
*G06F 30/3312* (2020.01)
*G06F 117/08* (2020.01)
*G06F 119/18* (2020.01)

(52) U.S. Cl.
CPC ...... *G06F 30/3312* (2020.01); *G06F 2117/08* (2020.01); *G06F 2119/18* (2020.01)

(58) Field of Classification Search
CPC .. G06F 30/3112; G06F 30/3312; G06F 30/33; G06F 30/331; G06F 2119/18; G06F 2117/08; G06F 30/00
USPC ...................................... 703/14, 13
See application file for complete search history.

(56) References Cited

U.S. PATENT DOCUMENTS

| | | | |
|---|---|---|---|
| 6,240,376 B1 | 5/2001 | Raynaud et al. | |
| 6,697,968 B1* | 2/2004 | Orfali | G06F 11/3466 |
| | | | 710/52 |
| 7,424,416 B1 | 9/2008 | Cavanagh et al. | |
| 2005/0198606 A1* | 9/2005 | Gupta | G01R 31/318314 |
| | | | 716/104 |
| 2011/0307847 A1 | 12/2011 | Liao et al. | |

(Continued)

OTHER PUBLICATIONS

Wang, Baobing et al., "HybridSim: A Modeling and Co-Simulation Toolchain for Cyber-Physical Systems", 2013, 17th IEEE/ACM International Symposium on Distributed Simulation and Real Time Applications, IEEE. (Year: 2013).*

(Continued)

*Primary Examiner* — Cedric Johnson
(74) *Attorney, Agent, or Firm* — Fenwick & West LLP

(57) ABSTRACT

A hybrid emulation system includes a hardware emulation system, a simulation system, and a co-simulation interface. The hardware emulation system emulates a first portion of a design under test (DUT) during a hybrid emulation. The emulation runs in a first time domain local to the hardware emulation system. The simulation system simulates a second portion of the DUT during the hybrid emulation. The simulation runs in a second time domain local to the simulation system. The first time domain and the second time domain are unsynchronized. The co-simulation interface is coupled to the simulation system and the hardware emulation system. The co-simulation interface communicates transactions and events between the hardware emulation system and the simulation system. For each transaction, the co-simulation interface captures a transaction time in the first time domain, and for each event, the co-simulation interface captures an event time in the first time domain.

20 Claims, 3 Drawing Sheets

(56) References Cited

U.S. PATENT DOCUMENTS

| | | | |
|---|---|---|---|
| 2013/0227367 A1* | 8/2013 | Czamara | G01R 31/3177 714/735 |
| 2014/0157215 A1* | 6/2014 | Wang | G06F 30/331 716/105 |
| 2015/0242296 A1* | 8/2015 | Mittal | G06F 11/3476 714/37 |
| 2017/0308629 A1 | 10/2017 | Petras et al. | |

OTHER PUBLICATIONS

Principe, Matteo et al., "A Distributed Shared Memory Middleware for Speculative Parallel Discrete Event Simulation", Mar. 2020, ACM Transactions on Modeling and Computer Simulation, vol. 30, No. 2, Article 11, ACM. (Year: 2020).*

Cadence—Palladium Hybrid, Cadence Design Systems, Inc., 2018, 3 pages [Online] [Retrieved on Jun. 21, 2018] Retrieved from the Internet<URL:https://www.cadence.com/content/cadence-www/global/en_US/home/tools/system-design-and-verification/acceleration-and-emulation/palladium-hybrid.html>.

Rizzatti, L., "Hardware Emulation for Software Validation (Part 2). Hybrid Emulation and Trace-Based Debug," Informa USA, Inc., May 5, 2017, 10 pages, [Retrieved on Jun. 21, 2018] Retrieved from the Internet<URL:http://www.electronicdesign.com/test-measurement/hardware-emulation-software-validation-part-2-hybrid-emulation-and-trace-based-0>.

* cited by examiner

TIME CORRELATION IN HYBRID EMULATION SYSTEM

CROSS REFERENCE TO RELATED APPLICATIONS

This application claims the benefit of priority under 35 U.S.C. § 119(e) to U.S. Provisional Application No. 62/527,971, filed on Jun. 30, 2017, which is incorporated herein by reference in its entirety.

TECHNICAL FIELD

The disclosure generally relates to hybrid emulation of a design under test (DUT).

BACKGROUND

In hybrid emulation, a portion of a design under test (DUT) is emulated in a hardware emulation system. The emulated portion of the design may be written in a hardware description language (HDL) that is compiled into an appropriate representation and then loaded into the field programmable gate arrays (FPGAs) of the emulator. Another portion of the design under test may be represented by a SystemC model that is simulated in a simulation system, such as a host computing device. For example, a virtual prototype of a processor may be simulated by the simulation system. The simulation system and the emulation system can communicate with each other during the hybrid emulation. Hybrid emulation can also be referred to as co-simulation. The DUT may represent an integrated circuit such as a system on chip (SoC), or a computing device with multiple chips.

In a SoC hybrid emulation example, a portion of the SoC may be modeled in high-level language such as SystemC, and the remainder of the SoC is modeled in Hardware Description Language (HDL). Consequently, the behavior of the system is simulated in using different engines, e.g., a hardware emulator and a SystemC simulator. The simulation and emulation may run concurrently (e.g., during functional verification) in a "free-running" mode, in which simulation and emulation engines run in their own time domains. The simulation and emulation synchronize on transactions (such as AMBA transactions) or events (such as interrupts). In free-running mode, the simulation and emulation do not synchronize, and so the respective time domains may be uncorrelated from and non-synchronized from one another.

Debugging system behavior is a challenge in the free-running mode. Transactions and events may be viewed using either SystemC tools (e.g., in a TLM transaction trace viewer) or emulation debug tools (e.g., QiWC signal waveforms). However, the transactions and events are shown in the time domain of the corresponding tools, so it is not possible to understand a correlation of activity between the two environments. In particular, viewing an activity in the simulation debug tool does not provide any information to how it is related to specific portions of emulation waveforms, and vice versa.

BRIEF DESCRIPTION OF THE DRAWINGS

Figure (FIG. 1 is a block diagram of a hybrid emulation system configured to perform a hybrid emulation of a design under test (DUT), according to one or more embodiments of the present disclosure.

DETAILED DESCRIPTION

Figure 1:
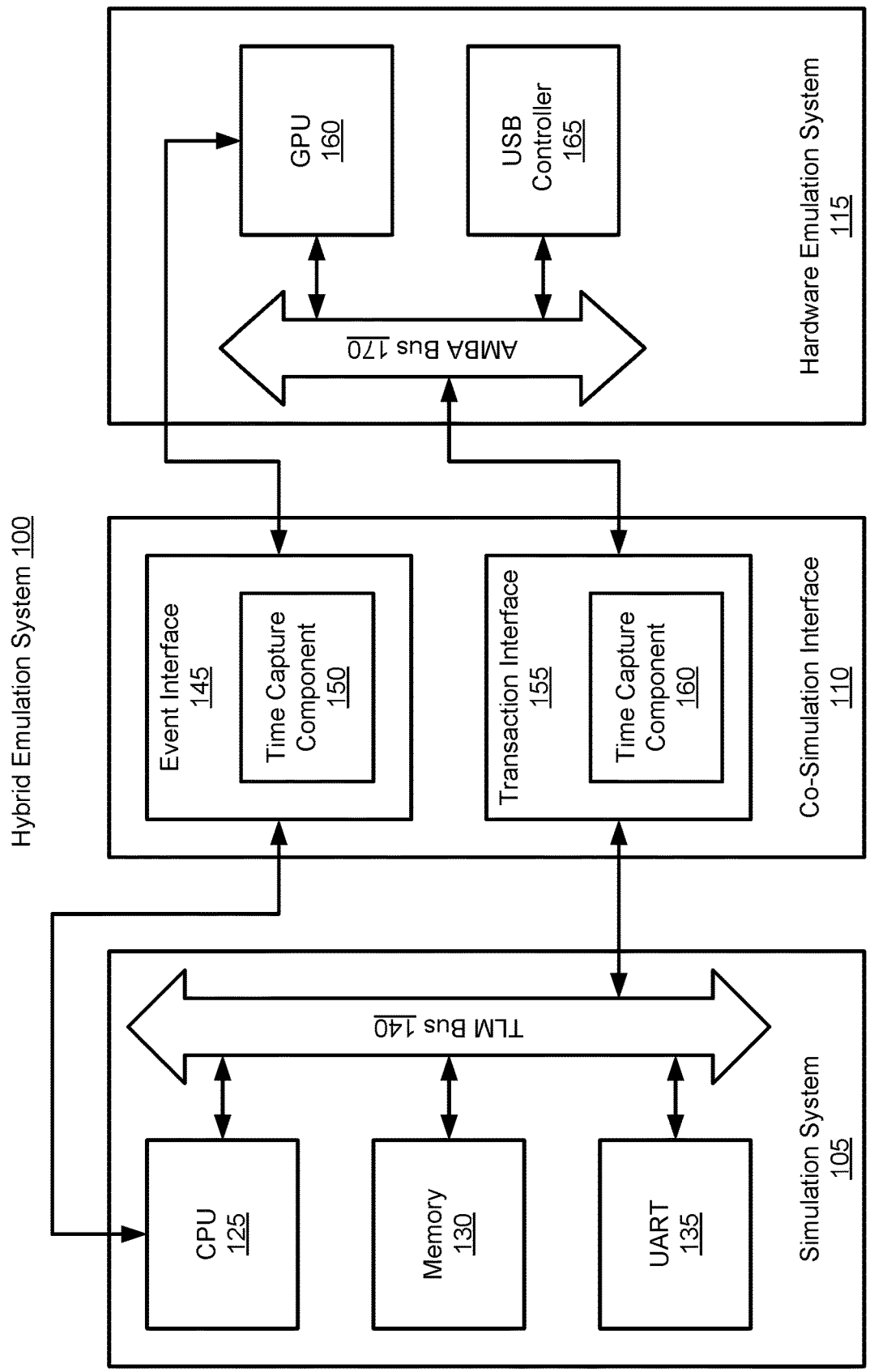

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments disclosed herein pertain to a hybrid emulation system for hybrid emulation of a design under test (DUT) to validate the DUT before manufacturing the DUT. A hybrid emulation system includes a hardware emulation system, a simulation system, and a co-simulation interface. The hardware emulation system emulates a portion (e.g., a first portion) of a DUT during a hybrid emulation. The emulation runs in a time domain local to the hardware emulation system (e.g., a first time domain). The simulation system simulates another portion (e.g., a second portion) of the DUT during the hybrid emulation. The simulation runs in a time domain local to the simulation system (e.g., a second time domain), and unsynchronized with the emulation time domain. The co-simulation interface is coupled to the simulation system and the hardware emulation system and communicates transactions and events between the hardware emulation system and the simulation system. For each transaction, the co-simulation interface captures a transaction time in the first time domain, and for each event, the co-simulation interface captures an event time in the first time domain.

Using co-simulation interface to capture the event time for each event, and the transaction time for each transaction, allows the hybrid emulation system to determine a correlation between activity in the simulation and activity in the emulation. For example, the co-simulation interface may include an event interface, which captures a time in the emulation time domain for each event, and a transaction interface, which captures a time in the emulation time domain for each transaction. The hybrid emulator also stores a time in the simulation time domain for each event and transaction. For example, a SystemC simulator stores analysis data for events and transactions; the analysis data includes times of the events and transactions in the simulator time domain. The hybrid emulation system determines a correlation between events and transactions in the two time domains based on the captured emulation times and stored simulation times. For example, the captured times in the emulation time domain are each stored with information identifying the event or transaction for which that time was captured, and the analysis data stores simulation times with the data describing the event or transaction. Thus, the hybrid emulation system stores times in both the simulation time domain (e.g., the second time domain) and the emulation time domain (e.g., the first time domain) for each event and transaction. The hybrid emulation system may match events within the two sets of time data (e.g., the captured emulation time data and the simulation time data) to correlate times in the simulation domain with times in the emulation domain.

The hybrid emulation system may include a debug program with a user interface showing analysis data from the simulation. The user interface may show both the emulation times and the simulation times for each event and transaction. Based on the captured emulation times, a circuit designer can easily access emulation waveforms that correspond to particular time periods in the simulation analysis data. In some embodiments, the debug program can retrieve one or more emulation waveforms that are correlated with a selected portion of the simulation analysis data. By using the co-simulation interface to capture times in the emulation domain, the circuit designer can more easily validate and debug the components of the DUT that are emulated compared to prior co-simulation systems, which had no way to correlate simulation results to emulation results. After debugging and validating the DUT, the circuit (e.g., a SoC design) can be taped out to be manufactured.

Example Hybrid Emulation System

Figure (FIG. 1 is a block diagram of a hybrid emulation system 100 configured to perform a hybrid emulation of a design under test (DUT), according to one or more embodiments of the present disclosure. A DUT may represent an integrated circuit such as a system on chip (SoC), or a computing device with multiple chips.

As shown, the hybrid emulation system 100 includes a simulation system 105, a co-simulation interface 110, and a hardware emulation system 115. The hardware emulation system 115 is configured to emulate a first portion of the DUT and the simulation system 105 is configured to emulate a second portion of the DUT during a hybrid emulation. The hardware emulation system 115 may be any emulation system (e.g., custom processor based, custom emulator on-chip, FPGA).

Hybrid emulation combines emulation and simulation (e.g., virtual prototyping) to enable earlier architecture validation and software development, as well as higher performance for software-driven hardware verification even when RTL source code for critical blocks is not available. For the hardware architect, hybrid emulation enables processor subsystems loaded into a hardware emulation system 115 to serve as a high-performance, cycle-accurate model for SoC performance and architecture validation through cycle accurate interfaces to SystemC models of other blocks, such as memory controllers, network-on-chip/busses, and subsystems in the simulation system 105. For the software developer, instruction accurate models in the virtual prototype are used for software development with the remaining SoC design blocks running at high speed in the hardware emulation system 115, reducing the modeling burden for complex blocks like graphics processing units (GPUs). For the verification engineer, pre-verified processor subsystem blocks may be moved out of the hardware emulation system 115 and executed on the simulation system 105 using a virtual prototype of the processor subsystem. This may free up emulator capacity while increasing overall performance, and allows an earlier emulation start as only a partial subset of the RTL subsystem needs to be available.

In hybrid emulation, a DUT is partitioned into different portions. A first portion of a DUT is emulated in a hardware emulation system 115 by loading a representation of the first DUT portion into, for example, FPGAs in the hardware emulation system 115. In the example shown in FIG. 1, the first portion of the DUT includes a GPU 160, a USB controller 165, and an AMBA Bus 170. In other examples, the hardware emulation system 115 is configured to emulate different portions or components. The emulated portion of the DUT may be originally written in a register transfer language (RTL) that is compiled into an appropriate representation and loaded into the hardware emulation system 115, thereby resulting in a representation of the first DUT portion. An example of a hardware emulation system 115 can be SYNOPSYS ZEBU.

Another portion (e.g. the processors, some peripherals) of the DUT may be represented by a C++ or SystemC software model within a virtual platform that is simulated in a simulation system 105. In the example shown in FIG. 1, the second portion of the DUT simulated by the simulation system 105 includes a CPU 125, a memory 130, a universal asynchronous receiver-transmitter (UART) 135, and a TLM Bus 140. In other examples, the simulation system 105 is configured to simulate different elements. The software model may include virtual prototypes of the element of the DUT that are simulated by the simulation system 105. A virtual prototype can be a SystemC virtual prototype. The virtual prototype can contain an instruction accurate processor model. The virtual prototype can be executed on the simulation system 105, thereby resulting in a simulation of the second DUT portion. The simulation system 105 can be a host computing device with a physical processor and physical memory.

The simulation system 105 and the hardware emulation system 115 are bridged by a co-simulation interface 110. The co-simulation interface 110 includes a channel that is a shared resource in both the simulation and emulation abstractions. The co-simulation interface provides two well-defined interfaces to bridge the two abstractions: an event interface 145 and a transaction interface 155. The event interface 145 communicates control events, such as resets and interrupts, from one system to the other. The CPU 125 in the simulation system 105 and the GPU 160 in the hardware emulation system 115 communicate directly with the event interface 145. The transaction interface 155 includes transactors for communicating transactions from one system to the other. The transaction interface 155 bridges a transaction-level modeling (TLM) bus 140 in the simulation system 105 and an advanced microcontroller bus architecture (AMBA) bus 170 in the hardware emulation system 115. The TLM bus 140 communicates with the CPU 125, memory 130, and UART 135, while the AMBA bus 170 communicates with the GPU 160 and USB controller 165.

The simulation system 105 and hardware emulation system 115 can proceed in free-running mode. The simulation system 105 and hardware emulation system 115 each have their own notions of time in different time domains, e.g., SystemC simulation time maintained by SystemC simulation kernel, and HDL emulation time maintained by an emulation clock advance controller. Any communication between two abstractions is through an explicit transaction, handled by the transaction interface 155, or signal event, handled by the event interface 145.

The problem of correlating the simulation time and the emulation time is solved by capturing absolute time information from the emulation domain and annotating the simulation analysis data with the captured emulation times. To capture the emulation time information, each component of the co-simulation interface 110 includes a time capture component. As shown in FIG. 1, the event interface 145 and the transaction interface 155 each include a time capture component 150 and 160, respectively. The time capture component 150 of the event interface 145 captures the absolute emulation time information from the hardware emulation system 115 for every signal event. The time capture component 160 of the transaction interface 155 captures the absolute emulation time information from the hardware emulation system 115 for every transaction. As a result, the hybrid emulation system 100 saves the emulation time of each transaction or signal event that passes through the co-simulation interface 110. The hybrid emulation system 100 may also save data that can be used to identify the events and transactions corresponding to the captured emulation times. The time capture components 150 and 160 may save the captured times locally on the co-simulation interface 110, or the time capture components 150 and 160 may transmit the captured times to the computer hosting the simulation system 105 (e.g., to a debug program) for storage and presentation to a user. For example, the time capture components 150 and 160 provides the captured times to the host computer through a C API in real-time, and a debug program running on the host computer stores the captured times with data identifying an event or transaction. The debug program may also receive and save event and transaction information and corresponding simulation times from the simulation system 105.

As an example, a control register read of the GPU 160 by the CPU 125 is initiated as a SystemC transaction, reach an AMBA transactor (XTOR) in the transaction interface 155 as a target, and get converted to AMBA bus signal protocol by the AMBA XTOR block as master with the GPU 160 as slave, and transmitted through the AMBA bus 170 to the GPU 160. The read value returned from GPU 160 via the AMBA bus 170 is converted back by AMBA XTOR in the transaction interface 155 into a TLM transaction payload, and the final value and status of the control registered is returned to the CPU 125 initiator, thus completing the read operation. The time capture component 160 captures the emulation time when the read request is transmitted to the AMBA bus 170 from the transaction interface 155, and when the read value is returned by the AMBA bus 170 to the transaction interface 155.

Figure 2:
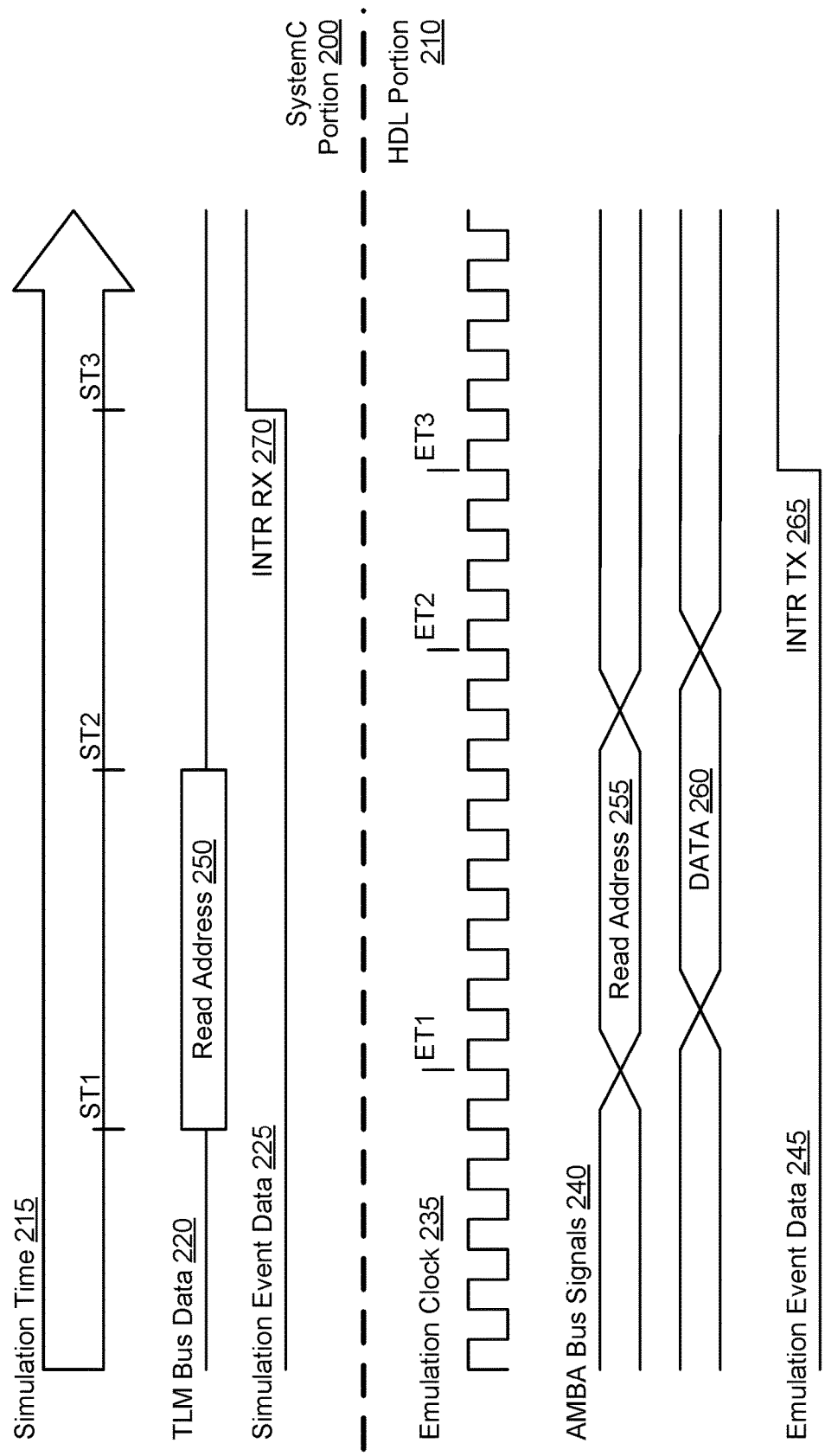
FIG. 2 is a diagram showing data from simulation and emulation portions of a hybrid emulation, according to one or more embodiments of the present disclosure.

FIG. 2 is a diagram showing data from simulation and emulation portions of a hybrid emulation, according to one or more embodiments of the present disclosure. The SystemC portion 200 of the diagram, which is above the dashed line, includes a timeline of simulation time 215, TLM bus data 220, and simulation event data 225. The TLM bus data 220 shows the simulation analysis data for TLM transactions, such as a read address transaction 250 issued by the CPU 125, discussed in the above example. The simulation event data 225 shows the simulation analysis data for signal events, such as the received interrupt (INTR RX) 270. The simulation time 215 shows the times in the simulation domain for events and transactions. For example, ST1 (simulation time 1) corresponds to the start of the read 250, ST2 (simulation time 2) corresponds to the end of the read 250, and ST3 (simulation time 3) corresponds to the interrupt 270.

The HDL portion 210 of the diagram, which is below the dashed line, includes an emulation clock 235, AMBA bus signals 240, and emulation event data 245. AMBA bus signals show emulation transaction signals over the AMBA bus 170. For example, the AMBA bus signals 240 show a read address 255, corresponding to read address 250, and a data access 260 for accessing data in response to the read request 255. The emulation event data 245 shows the emulation signals for signal events, such as the transmitted interrupt (INTR TX) 265. The emulation clock 235 notes the times in the emulation domain for events and transactions. For example, ET1 (emulation time 1) corresponds to the start of the read 255, ET2 (emulation time 2) corresponds to the end of the data access 260, and ET3 corresponds to the interrupt 265.

Based on the data shown in FIG. 2, there is no way to know the absolute time ET1 in the emulation corresponding to the SystemC time ST1, because the two functional simulation engines are running free-running mode without any time correlation. For example, in the simulation time domain, ST1 is 260752 nanoseconds (ns), ST2 is 260792 ns, and ST3 is 268100 ns; in the emulation time domain, ET1 is 40210 ns, ET2 is 40250 ns, and ET3 is 40290 ns. There is no apparent correlation between these times, and over the course of a hybrid emulation with many transactions and events, it is challenging to match a simulation portion (such as simulation portion 200) to the corresponding emulation portion (such as HDL portion 210). The ST1-ET1, ST2-ET2, ST3-ET3 correlations are important information to have when debugging in interactive or post processing mode, where full history of both SystemC simulation analysis data and emulation waveforms are available. The SystemC analysis data can include data about activities that occur during the simulation over time. However, without the time capture components 150 and 160, no such correlation data exists for viewing the analysis data of both abstractions in context of a common activity, e.g. the transactions diagrammed in FIG. 2. Prior to having this data, a designer would manually search the emulation data for events, e.g., a particular address being read 250 (e.g., ADDR=0x56230020). This process is time consuming, and if this address is read multiple times during the hybrid emulation, it is even more challenging to locate the desired emulation data.

Figure 3:
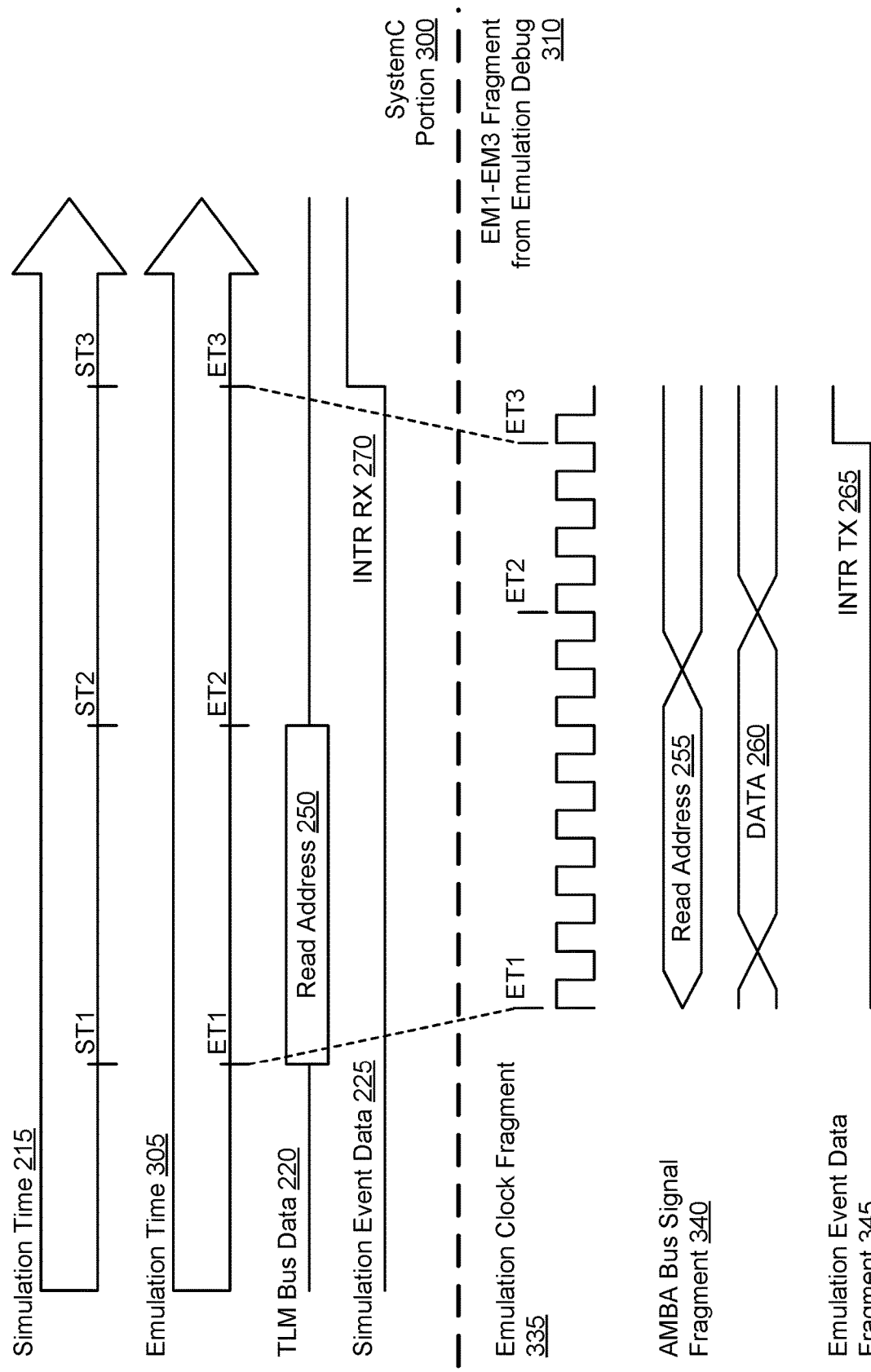
FIG. 3 is a diagram showing data from simulation and emulation portions of a hybrid emulation with time correlated between the simulation and emulation, according to one or more embodiments of the present disclosure.

FIG. 3 is a diagram showing data from simulation and emulation portions of a hybrid emulation with time correlated between the simulation and emulation, according to one or more embodiments of the present disclosure. As shown in FIG. 3, the SystemC portion 300 includes timelines for both simulation time 215 and emulation time 305. The emulation time 305 shows the times in the emulation time domain that correspond to transactions in the TLM bus data 220 and events in the simulation event data 225. The emulation time 305 is captured by the time capture components 150 and 160, and may be communicated by a C, C++, or SystemC API to the host computer running the simulation system 105. The debug program can display the simulation time 215, emulation time 305, TLM bus data 220, and simulation event data 225 together in a single user interface.

Based on the emulation time 305 shown in the debug program, the user can also access the emulation waveforms shown in the EM1-EM3 fragment from emulation debug 310. For example, the user can enter the emulation times displayed in the SystemC portion 300 in post-run emulation debug program, such as ZEBU zPRD, to retrieve the EM1-EM3 fragment waveforms 310, which include the emulation clock fragment 335, the AMBA bus signal fragment 340, and the emulation event data fragment 345. As another example, the debug program can produce an auto-correlated view of SystemC debug data and emulation signal waveforms in a single interface. This view would include all the information of FIG. 3 in a single display. As another example, the debug program can allow a user to select a portion of the SystemC portion (e.g., select a portion of the timeline of emulation times 305) and automatically retrieve and display the EM1-EM3 fragment 310 based on the selection.

Upon reading this disclosure, a reader will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A hybrid emulation system for validating an integrated circuit design for manufacture, the system comprising one or more processors to perform operations comprising:
    emulating, at a hardware emulation system, a first portion of a design under test (DUT) during a hybrid emulation, the emulation of the first portion of the DUT running in a first time domain local to the hardware emulation system;
    simulating, at a simulation system, a second portion of the DUT during the hybrid emulation, the simulation of the second portion of the DUT running in a second time domain local to the simulation system, wherein the first time domain and the second time domain are unsynchronized;
        communicating, at a co-simulation interface coupled to the simulation and the hardware emulation system, transactions and events between the hardware emulation system and the simulation system;
        capturing, at the co-simulation interface and for each transaction, a transaction timestamp in the first time domain corresponding to the transaction;
        capturing, at the co-simulation interface and for each event, an event timestamp in the first time domain corresponding to the event; and
        identifying, for a particular transaction, a captured transaction timestamp of the particular transaction in the first time domain based on a captured transaction timestamp of the particular transaction in the second time domain.

2. The hybrid emulation system of claim 1, wherein the operations further comprise storing, at the simulation system, data correlating each transaction to a transaction timestamp in the second time domain and data correlating each event to an event timestamp in the second time domain.

3. The hybrid emulation system of claim 2, wherein the operations further comprise:
    transmitting, at the co-simulation interface, the captured transaction timestamps in the first domain and the captured event timestamps in the first domain to the simulation system;
    storing, at the simulation system, data correlating each transaction to its captured transaction timestamp in the first time domain and captured transaction timestamp in the second time domain; and
    storing, at the simulation system, data correlating each event to its captured event timestamp in the first time domain and captured event timestamp in the second time domain.

4. The hybrid emulation system of claim 3, wherein the operations further comprise, at a debug program:
    identifying, for a particular event, a captured event timestamp of the event in the first time domain based on its event timestamp in the second time domain.

5. The hybrid emulation system of claim 4, wherein the operations further comprise, at the debug program:
    concurrently displaying, in a single user interface, analysis data that includes the particular transaction, its captured transaction timestamp in the first time domain, and its transaction timestamp in the second time domain; and
    concurrently displaying, in the single user interface, analysis data that includes the particular event, its captured event timestamp in the first time domain, and its event timestamp in the second time domain.

6. The hybrid emulation system of claim 4, wherein the operations further comprise, at the debug program, retrieving an emulation waveform including one of the captured transaction timestamp in the first time domain and the captured event timestamp in the first time domain based on receiving a selection of a respective one of the transaction timestamp in the second time domain and the event timestamp in the second time domain.

7. The hybrid emulation system of claim 1, wherein the operations further comprise:
    communicating, at an event interface of the co-simulation interface, events between the hardware emulation system and the simulation system, and to capture a timestamp in the first time domain of each event; and
    communicating, at a transaction interface of the co-simulation interface, transactions between the hardware emulation system and the simulation system, and to capture a timestamp in the first time domain of each transaction.

8. A method of validating an integrated circuit design for manufacture comprising:
    emulating, by a hardware emulation system, a first portion of a design under test (DUT), the emulation of the first portion of the DUT running in a first time domain local to the hardware emulation system;
    simulating, by a simulation system, a second portion of the DUT, the simulation of the second portion of the DUT running in a second time domain local to the simulation system, wherein the first time domain and the second time domain are unsynchronized;
    communicating, by a co-simulation interface coupled to the simulation system and the hardware emulation system, transactions and events between the hardware emulation system and the simulation system;
    for each transaction, capturing, by the co-simulation interface, a transaction timestamp in the first time domain corresponding to the transaction;
    for each event, capturing, by the co-simulation interface, an event timestamp in the first time domain corresponding to the event; and
    identifying, by a debug program, for a particular transaction, a captured transaction timestamp of the particular transaction in the first time domain based on a captured transaction timestamp of the particular transaction in the second time domain.

9. The method of claim 8, further comprising storing, by the simulation system, data correlating each transaction to a transaction timestamp in the second time domain and data correlating each event to an event timestamp in the second time domain.

10. The method of claim 9, further comprising:
transmitting, by the co-simulation interface, the captured transaction timestamps in the first domain and the captured event timestamps in the first domain to the simulation system;
storing, by the simulation system, data correlating each transaction to its captured transaction timestamp in the first time domain and captured transaction timestamp in the second time domain; and
storing, by the simulation system, data correlating each event to its captured event timestamp in the first time domain and captured event timestamp in the second time domain.

11. The method of claim 10, further comprising:
identifying, by the debug program, for a particular event, a captured event timestamp of the event in the first time domain based on its event timestamp in the second time domain.

12. The method of claim 11, further comprising:
concurrently displaying, in a single user interface of the debug program, analysis data that includes the particular transaction, its captured transaction timestamp in the first time domain, and its transaction timestamp in the second time domain; and
concurrently displaying, in the single user interface of the debug program, analysis data that includes the particular event, its captured event timestamp in the first time domain, and its event timestamp in the second time domain.

13. The method of claim 11, further comprising:
receiving, by the debug program, a selection of one of the transaction timestamp in the second time domain and the event timestamp in the second time domain; and
retrieving, by the debug program, an emulation waveform including one of the captured transaction timestamp in the first time domain and the captured event timestamp in the first time domain.

14. A non-transitory computer readable medium storing instructions that, when executed by a processor, cause the processer to perform operations for validating an integrated circuit design for manufacture comprising:
providing a co-simulation interface for communicating transactions and events between:
a hardware emulation system configured to emulate a first portion of a design under test (DUT), the emulation of the first portion of the DUT running in a first time domain local to the hardware emulation system, and
a simulation system configured to simulate a second portion of the DUT, the simulation of the second portion of the DUT running in a second time domain local to the simulation system, wherein the first time domain and the second time domain are unsynchronized; and
for each transaction communicated between the hardware emulation system and the simulation system, capturing a transaction timestamp in the first time domain corresponding to the transaction;
for each event communicated between the hardware emulation system and the simulation system, capturing an event timestamp in the first time domain corresponding to the event; and
identifying, for a particular transaction, a captured transaction timestamp of the particular transaction in the first time domain based on a captured transaction timestamp of the particular transaction in the second time domain.

15. The non-transitory computer readable medium of claim 14, wherein a first portion of the transactions and a first portion of the events are communicated from the hardware emulation system to the simulation system, and a second portion of the transactions and a second portion of the events are communicated from the simulation system to the hardware emulation system.

16. The non-transitory computer readable medium of claim 14, the operations further comprising storing data correlating each transaction to a transaction timestamp in the second time domain, and storing data correlating each event to an event timestamp in the second time domain.

17. The non-transitory computer readable medium of claim 16, the operations further comprising:
storing data correlating each transaction its captured transaction timestamp in the first time domain and captured transaction timestamp in the second time domain; and
storing data correlating each event to its captured event timestamp in the first time domain and captured event timestamp in the second time domain.

18. The non-transitory computer readable medium of claim 17, the operations further comprising:
identifying, for a particular event, a captured event timestamp of the event in the first time domain based on its event timestamp in the second time domain.

19. The non-transitory computer readable medium of claim 18, the operations further comprising:
concurrently displaying, in a single user interface, analysis data that includes the particular transaction, its captured transaction timestamp in the first time domain, and its transaction timestamp in the second time domain; and
concurrently displaying, in the single user interface, analysis data that includes the particular event, its captured event timestamp in the first time domain, and its event timestamp in the second time domain.

20. The non-transitory computer readable medium of claim 18, the operations further comprising:
receiving a selection of one of the transaction timestamp in the second time domain and the event timestamp in the second time domain; and
retrieving an emulation waveform including one of the captured transaction timestamp in the first time domain and the captured event timestamp in the first time domain.

* * * * *